United States Patent
Kostrzewski et al.

Patent Number: 6,137,912
Date of Patent: Oct. 24, 2000

[54] METHOD OF MULTICHANNEL DATA COMPRESSION

[75] Inventors: Andrew A. Kostrzewski, Garden Grove; Michael A. Piliavin, Los Angeles, both of Calif.

[73] Assignee: Physical Optics Corporation, Torrance, Calif.

[21] Appl. No.: 09/136,624

[22] Filed: Aug. 19, 1998

[51] Int. Cl.⁷ .............................. G06K 9/36; G06K 9/46
[52] U.S. Cl. ..................... 382/236; 348/388; 348/412; 382/238; 382/239
[58] Field of Search ................................ 348/388, 401, 348/403, 404, 409, 411, 412, 415, 420; 382/236, 238, 232, 239, 248, 250

[56] References Cited

U.S. PATENT DOCUMENTS

| | | | |
|---|---|---|---|
| 4,769,826 | 9/1988 | Kubo et al. | 375/122 |
| 5,253,057 | 10/1993 | Terui et al. | 358/136 |
| 5,832,234 | 11/1998 | Iverson et al. | 348/398 |

*Primary Examiner*—Amelia Au
*Assistant Examiner*—Timothy M. Johnson
*Attorney, Agent, or Firm*—Nilles & Nilles, S.C.

[57] ABSTRACT

A method for compressing multiple channels of data using an MPEG-compatible motion estimation technique. The method determines the differences between frames within each channel and among the channels and encodes those differences. To facilitate compression, some of the frames are predicted and some of the frames are skipped. The differences between the current frame and the predicted frame for each channel are computed for each successive group of frames, and then compared, after each group of frames of each channel is encoded, to a threshold level $E_0$. In the event that, for any of the groups of frames, the difference between the current frame and the predicted frame of any of the channels reaches the threshold, the method of the present system will insert an I-frame into the sequence of encoded frames, thus restarting the encoding process with an I-frame. The method of computing differences and encoding I-frames is implemented for both intra-channel differences (within each channel) and inter-channel differences (between the channels). The encoded frames can thereafter be transmitted to a decoder for reconstructing the frames for display. Preferably, both the encoding and/or decoding operations are implemented with artificial intelligence (AI) or fuzzy logic software.

27 Claims, 12 Drawing Sheets

METHOD OF MULTICHANNEL DATA COMPRESSION

FIELD OF THE INVENTION

The present invention relates to video compression systems, and in particular systems that utilize a motion estimation method to compress video data.

BACKGROUND OF THE INVENTION

Image compression reduces the amount of data necessary to represent a digital image by eliminating spatial and/or temporal redundancies in the image information. Compression is necessary in order to efficiently store and transmit video image information, e.g., over the internet. Without compression, most applications in which image information is stored and/or transmitted would be rendered impractical or impossible. A few seconds worth of raw video data could easily fill up and overwhelm an average PC's hard drive.

In the art, single channel video compression can be accomplished by taking an initial frame of a video in uncompressed form, and using that frame as a reference frame for encoding video information pertaining to subsequent frames. Rather than encoding and transmitting the entire video content of each frame, the frames are compressed by initially determining the differences between predetermined frames in a sequence, including an initial frame and a predicted frame, and then transmitting only these differences to a decoder. The decoder then reconstructs at least some of the frames of the video based on these differences. Such motion estimation systems also "skip" a number of frames (intermediate frames) which can be readily estimated because they typically include relatively few motion changes from the previous frame. As a result, the actual video content of only a certain number of frames, e.g., every fourth frame, is analyzed. To accommodate the resultant gaps, the intermediate frames are predicted based on the relationships between the predetermined frames and the differences between them. By utilizing such motion estimation methods, an entire video can be transmitted and reconstructed with high image quality and relatively low transmission bandwidth, which are critical features for transmitting video data. For instance, considering that if one assumes $512^2$ number of pixels, 8-bit gray level, and 30 Hz full-motion video rate, a bandwidth of 60 Mbps is required. To compress the video data into the required data rate of 128 kpbs from a full video uncompressed bandwidth of 60 Mbps, a 468:1 image compression rate is required. And, for VGA full motion video, this compression rate requirement is quadrupled.

Another necessary feature of video compression concerns accounting for large motion changes in the sequence of frames. For example, MPEG video compression is capable of accounting for such changes, in a single channel of video, by asynchronously sending an "I frame" (essentially a new reference frame). However, the I-frames are inserted every 15 frames regardless of video content. By introducing I-frames asynchronously into the encoded video bit stream, such systems inefficiently increase signal bandwidth. For example, when an I-frame is inserted into a series of encoded frames not containing significant motion, bandwidth is unnecessarily used because transmission of an entire new frame is unnecessary. To the contrary, when an I-frame is not inserted in the video bitstream when the sequence of frames includes a lot of motion, significant errors and artifacts are created. A significant improvement on the above-described MPEG video compression method, also using motion estimation, is realized by the novel "smart" system shown and described in pending U.S. patent application Ser. No. 08/901,832, which inserts I-frames only when warranted by video content (described below). Pending U.S. patent application Ser. No. 08/901,832 is expressly incorporated herein by reference.

The single channel compression method discussed in general terms immediately above will hereinafter be more specifically described in conjunction with the appended figures. As shown in FIG. 1, a method 10 for forming a compressed video data stream for a single channel of video includes taking an initial frame $S_1$ from a single source, e.g., a video camera, and typically compressing frame $S_1$ with standard compression techniques. Next, method 10 skips or ignores a predetermined number of subsequent frames, e.g., the two frames shown in phantom in FIG. 1, and predicts the next frame, $P_1^1$. Then, the error or difference $\Delta_1^1$ between frame $S_1$ and the predicted frame (and in this case third subsequent frame) $P_1^1$ is determined.

Method 10 next computes and encodes "filler" frames, $B_1^1$ and $B_2^1$, which are predicted forms of the skipped frames, the second and third frames in FIG. 1. The predicted B frames are derived based on the $S_1$ frame and the $P_1^1$ frame (as shown by the two-headed arrows in phantom in FIG. 1) and the differences, $\Delta_1^1$, between them, using known techniques. By compressing the frames in this fashion, the encoder encodes only the differences $\Delta_1^1$, along with the full video content of initial frame $S_1$ (in compressed form), thus providing sufficient information to reconstruct $S_1$ and $P_1^1$. A highly encoded skeletal portion of the intermediate predicted frames $B_1^1$ and $B_2^1$ may also be encoded; notably, however, when transmitted, this information does not significantly affect the signal bandwidth.

As mentioned above, an additional encoding step involves accounting for significant changes in motion between successive frames by either asynchronously inserting an I-frame into the video data bitstream or, as shown and described in the above-referenced application Ser. No. 08/901,832, determining, with specially designed "smart" software, whether inserting an I-frame is warranted by motion changes in the sequence of frames. The latter approach typically involves segmenting the frames into search blocks and accumulating the error between corresponding blocks of the initial S-frames and their corresponding P-frames, i.e., the predicted third subsequent frames.

When the accumulated error exceeds a predetermined threshold value, a new I-frame is substituted as the next subsequent frame, and the encoding begins as described above by computing the differences between the new reference initial frame, $I_1$, and the next predicted P frame, the third subsequent frame thereafter. With the I-frame as the new reference initial frame, the encoder determines the motion differences, $\Delta_2^1$, between frame $I_1$, and the next predicted P frame, $P_2^1$, while the intermediate frames $B_1^{1\prime}$ and $B_2^{1\prime}$ are computed in accordance with known techniques, as discussed previously. If the error does not reach the threshold, meaning that the image correlation between the subject frames is above the threshold value, the existing P frame signal is retained for the beginning of what is the second successive group of frames to be encoded. In this case, the $P_1^1$ frame becomes the reference initial frame for the next group of frames. The system continues to encode the frames in such successive groupings to provide a compressed data bitstream representing the entire video.

Referring next to FIG. 2, the encoded signals can be transmitted in a sequence 12 (representing only a portion of the frames of the video) to a decoder. Note that the series of signals of the transmission sequence shown in FIG. 2 does not reflect any occurrence of high motion in the sequence of frames, i.e., no I-frames have been encoded.

Initially, in Step 14, the encoder transmits the first group of encoded signals, Group I, to the decoder. These signals include the encoded initial reference frame $S_1$ and the $\Delta_1^1$ signal, and typically the B-frames, transmitted in that order. Next, the encoder in Step 16 transmits the second group of signals (Group II) which, when an I-frame is not encoded in the sequence, includes only the $\Delta_2^1$ signal followed by, when appropriate, the intermediate $B_1^{1\prime}$ and $B_2^{1\prime}$ frames. Unlike the Group I signals which included a compressed form of reference initial frame $S_1$, the reference initial frame corresponding to Group II, which is $P_1^1$, does not need to be sent because the decoder already decoded and stored the $P_1^1$ frame in memory when it decoded the Group I signals. In sum, when an I-frame is not encoded, the new reference frame for the next group of signals will not have to be sent because the new reference frame will be the decoded and stored P frame from the previous Group.

The encoder then proceeds to send the Group III signals which include the $\Delta_3^1$ signal followed by signals indicative of the compressed skeletal forms of the $B_1^{1\prime\prime}$ frame and the $B_2^{1\prime\prime}$ frame in Step 18. Similarly, method 10 then transmits subsequent groups of signals until all encoded frames of the video are transmitted. Note that sequence 12 is presented for illustrative purposes only and that, in reality, video usually exhibits at least some significant motion changes which will be reflected by the insertion of encoded I-frames in the compressed video data stream.

The receiver/decoder then executes a method 24, as depicted in FIG. 3, to re-create the sequence of frames of the single channel of video. (Note that the symbolic representation $\{x, y\} \rightarrow w$ indicates that signals "x" and "y" are combined in a preprogrammed manner by specially designed algorithms to produce the signal "w".) After receiving the encoded signals of Group I in Step 26, method 24, in Step 28, decompresses reference initial frame $S_1$. Thereafter, method 24 performs Step 30 by decompressing $\Delta_1^1$, the signal which represents the motion difference between the reference initial frame, $S_1$, and the predicted P frame, $P_1^1$, for Group I. The decompression performed by the method in Steps 28 and 30 is standard decompression of the corresponding signals that were compressed using standard compression techniques in the encoding process; for example, as mentioned previously MPEG, compression/decompression can be used.

Then, in Step 32, method 24 combines Group I signals $S_1$ and $\Delta_1^1$ to re-create frame $P_1^1$, which is thereafter used in combination with $S_1$ and $\Delta_1^1$ in Step 34 to re-create predicted frames $B_1^1$ and $B_2^1$. With the $S_1$ frame restored in this manner, and the $P_1^1$ frame re-created, the decoder can transmit the signals indicative of these frames to a display unit (not shown), as depicted in Step 36, in the sequence indicated, i.e., $S_1$, $B_1^1$, $B_2^1$ and finally $P_1^1$.

Next, method 24 executes Step 38 to determine whether an I-frame was encoded into the video bitstream of the second group of frames (Group II). Again, in standard video compression an I-frame is inserted into the video bitstream every 15 frames regardless of the video content, while the method in the above-referenced pending application, incorporated herein, only inserts an I-frame when high motion content is present. The latter method is preferred.

In the event that an I-frame is not encoded (as in the examples described in connection with FIGS. 1 and 2), method 24 executes Step 40 by decompressing $\Delta_2^1$ using, for example, MPEG decompression algorithms. Using $\Delta_2^1$, method 24 re-creates the next P frame, $P_2^1$, in Step 42 by combining $\Delta_2^1$ with the reference initial frame for Group II, $P_1^1$ (stored in memory when the Group I signals were decoded in Step 32).

After creating the P frame $P_2^1$, method 24 combines the new reference initial frame, the P frame of Group I, $P_1^1$, along with the just created P frame (the reference predicted frame), $P_2^1$, and the motion difference signal $\Delta_2^1$ to create B frames $B_1^{1\prime}$ and $B_2^{1\prime}$ in Step 44. Once the aforementioned signals have been created, the decoder transmits the decoded signals to the display unit in the sequence shown in Step 46, i.e., $B_1^{1\prime}$, followed by $B_2^{1\prime}$ and finally followed by $P_2^1$ (representing, in this example, the seventh frame of the video). This re-creation, transmission and display of the groups of signals is re-executed until the entire video is displayed (Step 48).

In the event that an I frame is encoded into the video bitstream as the next subsequent frame, the decoder substitutes $I_1$ for $S_1$ and executes the Steps of method 24 from the beginning. In particular, the method 24 decompresses $I_1$ in Step 50, using standard decompression algorithms and then, in Step 52, decompresses the encoded signal relating to the differences between $I_1$ and the P frame, $P_{1(new)}^1$, associated with $I_1$, $\Delta_{1(new)}^1$. Then, $P_{1(new)}^1$ is reconstructed by combining $I_1$, with $\Delta_{1(new)}^1$ (Step 54). Then, the highly encoded B frames, $B_{1(new)}^1$ and $B_{2(new)}^1$, are reconstructed in accordance with algorithms that combine $I_1$, $\Delta_{1(new)}^1$ and $P_{1(new)}^1$ in a pre-programmed fashion (Step 56). In Step 58, the decoder transmits the decoded signals $I_1$, $B_{1(new)}^1$, $B_{2(new)}^1$ and $P_{1(new)}^1$ to the display unit for display in that order.

Although the above-described system provides advantages relating to efficient use of bandwidth without sacrificing video quality in a single channel system, the art of video signal compression is in need of a system that can provide data compression of multiple sources of video. A system is desired which not only can determine differences among frames within a channel, but can cross correlate frames from multiple sources. Such a system would be particularly beneficial with regard to applications in which there is a high degree of similarity between the information obtained by each source, wherein entire video content does not need to be transmitted to re-create the video from each source.

There are a variety of such multiple-channel applications. For instance, stereoscopic data consists of multiple channels of input, typically two sources looking at an object from two points of view, for forming a 3-D image. Clearly, there is a significant amount of redundant information between the two sources. Another quite common application is capturing video in a "look-around" environment where multiple cameras are utilized to look at a range of scenery or a designated object, with each camera accounting for one channel of data representing a particular view of the designated object or scene, e.g, from a variety of angles. In either of these situations, it would be desirable to coordinate the multiple sources such that the redundant information between the sources would not have to be encoded and transmitted to re-create the entire video of each source, thus tending to maximize the throughput of data and conserve signal bandwidth.

In yet another application, a single camera may be used to look at a spectral image whereby the signal obtained is divided into separate channels based upon narrow bandwidth windows using filters. When looking at such images, hundreds of channels can be realized within a few nanometers. Notably, the image data in each such channel contains a tremendous amount of correlated data vis-a-vis adjacent channels, each channel corresponding to a slightly different bandwidth. It is very inefficient to transmit full video content of each of these channels.

In still another application, data captured by a single source at different times may have a significant amount of correlated data, as may be the case when using a video phone from a particular environment to send information over the internet. For example, if the user transmits a video phone message over the internet on a subsequent day from the same place as on a previous day, much of the surrounding information will stay the same, and only certain aspects of the transmission will change, e.g., the face expressions of the user. Due to the amount of similar data from each of the transmissions, it is inefficient to encode and transmit all the information contained in each message.

In each of these applications, all of the captured information does not need to be encoded because there is a relatively high degree of similar information gathered by each of the sources. Therefore, a system is desired that, in conjunction with standard compression techniques, takes advantage of this redundant information.

SUMMARY OF THE INVENTION

The present invention provides an efficient method of data compression for multiple channels of, preferably, video. The present system takes advantage of the significant amount of redundant information that is present in a variety of video applications by encoding only the differences between the frames of each channel (intra-channel compression) and the differences among corresponding frames of separate channels (inter-channel compression).

According to the preferred embodiment of the present invention, a method for compressing a plurality of channels of video includes the steps of taking an initial frame of each channel and predicting a plurality of subsequent frames, wherein each of the predicted frames corresponds to one of the initial frames. Thereafter, the method computes the difference between each of the initial frames and its corresponding predicted frame, and compares the differences to a predetermined threshold value. In the event that any difference between the initial frame and its corresponding predicted frame reaches the threshold value, the method inserts an I-frame as the next subsequent frame of each channel in the sequence of encoded video signals.

According to a further aspect of the invention, for each channel, each of the initial frames and each of the corresponding predicted frames are divided into search blocks. Thereafter, the differences between each block of the initial frame and a corresponding block of the corresponding predicted frame is determined. The block differences for each channel are accumulated and the accumulated block differences are compared to a threshold value. If any accumulated block difference reaches said threshold, the method inserts an I-frame as the next subsequent frame either for all of the channels or for that particular channel only.

According to a still further aspect of the invention, the method includes encoding a group of video frames including a predetermined number of consecutive frames of each channel. In particular, encoding the video frames includes taking an initial frame of each channel, including a reference channel having a reference initial frame and then predicting a subsequent frame, including a reference predicted frame, of each channel wherein each of the predicted frames corresponds to one of the initial frames. Thereafter, the method determines, for each channel an intra-channel difference between each of the initial frames and its corresponding predicted frame. In addition, the method determines an initial inter-channel difference between the reference initial frame and each of the initial frames of the remaining channels. The method then determines a predicted inter-channel difference between the reference predicted frame and each of the predicted frames of the remaining channels. If any intra-channel difference, initial inter-channel difference or predicted inter-channel difference exceeds a corresponding predetermined threshold, the method encodes an I-frame having full video content that restarts the encoding process. For both of the inter-channel difference determinations, the method generates a signal indicative of the respective inter-channel difference.

According to a still father aspect of the invention, the compression method includes transmitting and reconstructing the frames of each of the channels of video in a decoder. Initially, the method decompresses the reference initial frame of the reference channel, encoded with its full video content using standard decompression techniques using information from the frame itself such as MPEG intra-frame decompression. Thereafter, each of the initial frames is reconstructed from the reference initial frame and a corresponding one of the initial inter-channel difference signals. Thereafter, the reference predicted frame is reconstructed from the reference initial frame and a corresponding one of the intra-channel difference signals. Finally, the method reconstructs each of the predicted frames, except the reference predicted frame, by processing the reconstructed reference predicted frame and a corresponding one of the predicted inter-channel difference signals. This decoding process is repeated for each successive group of encoded frames, which may include one or more I-frames that restarts the encoding process. As such, the decoder can then transmit the decoded signals to a display unit for display in a proper sequence.

These and other features, advantages and objects of the present invention will be further appreciated by those skilled in the art by reference to the following specification, claims and appended drawings.

DETAILED DESCRIPTION OF THE PREFERRED EMBODIMENTS

Figure 1:
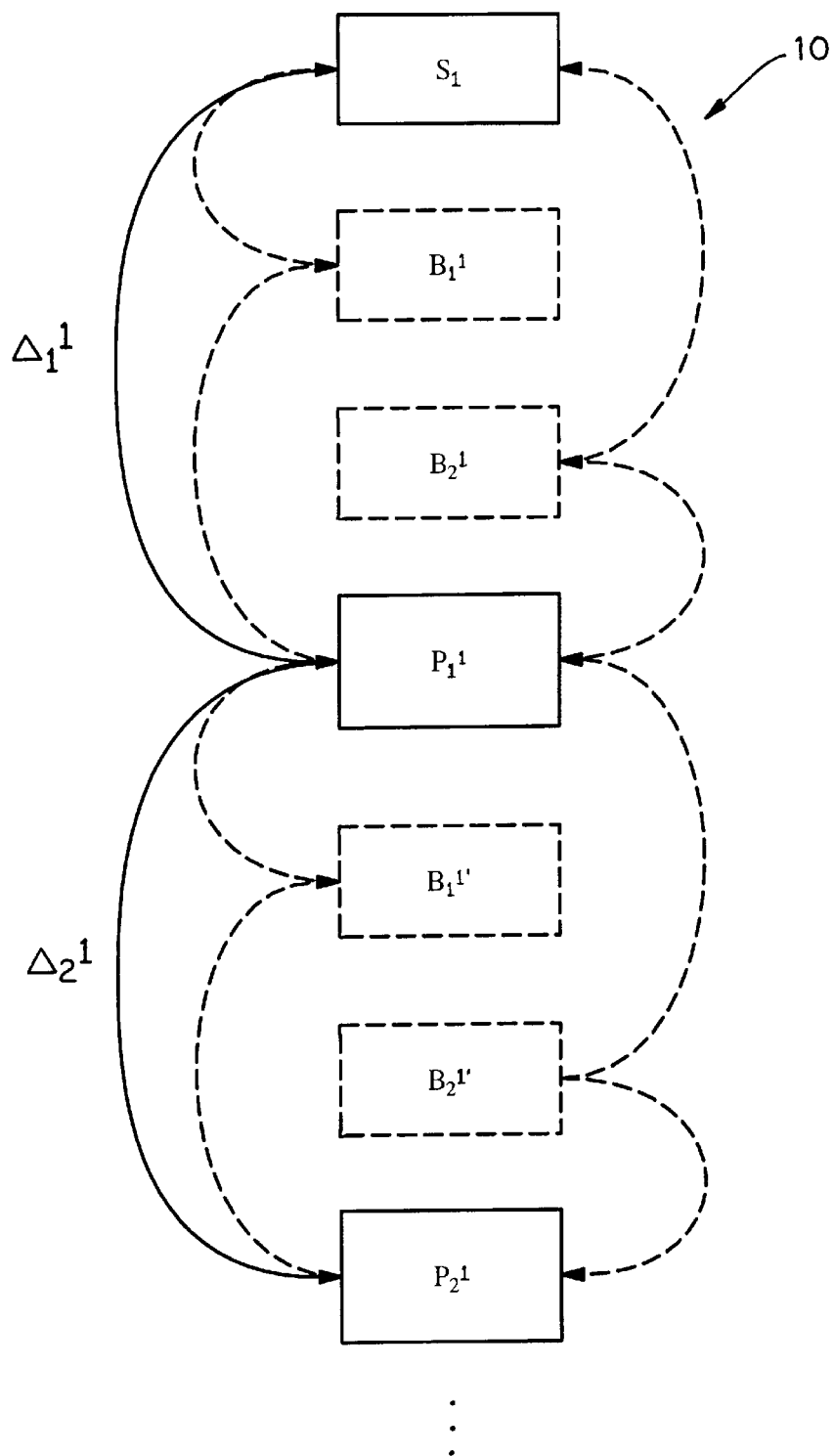
FIG. 1 is a schematic diagram illustrating a method of compressing frames of a single channel of video data.
Figure 2:
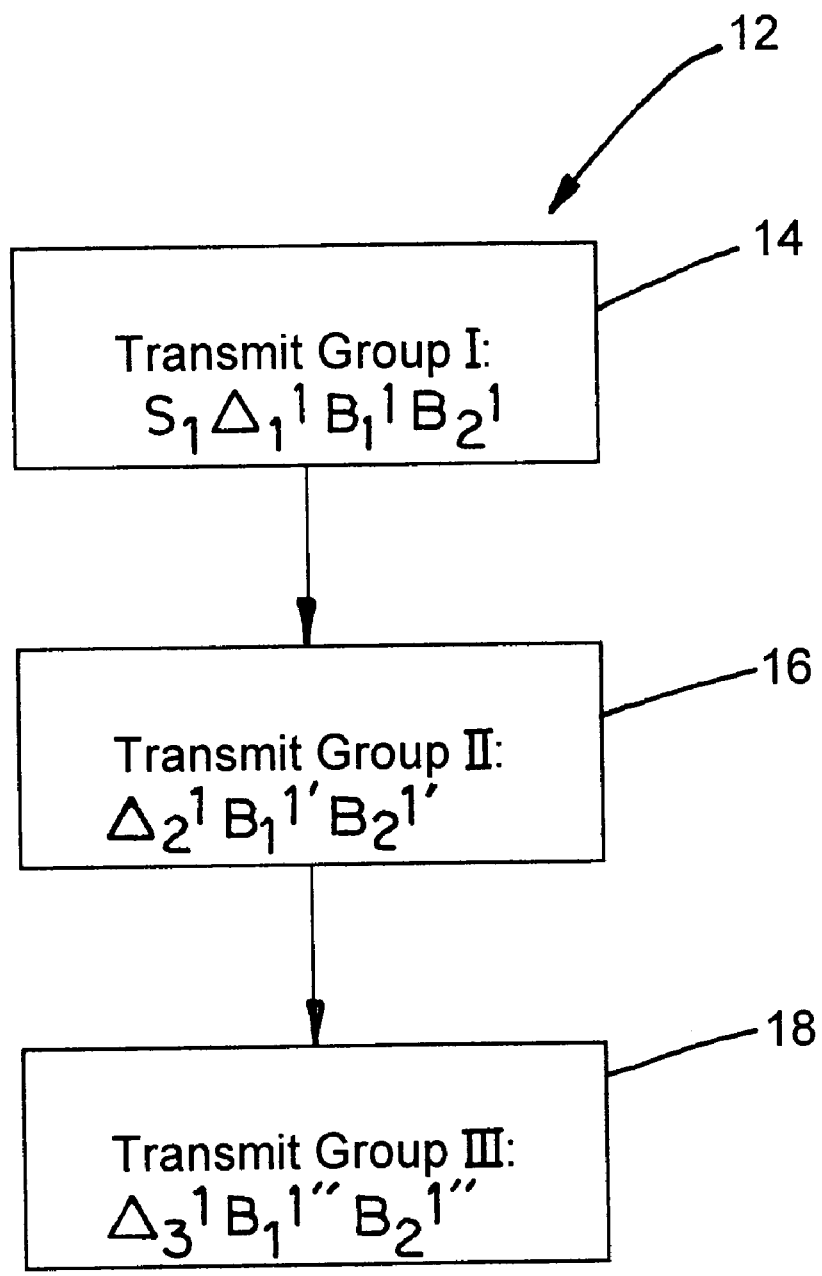
FIG. 2 is a flow diagram illustrating a sequence for transmitting the data encoded in FIG. 1.
Figure 3A:
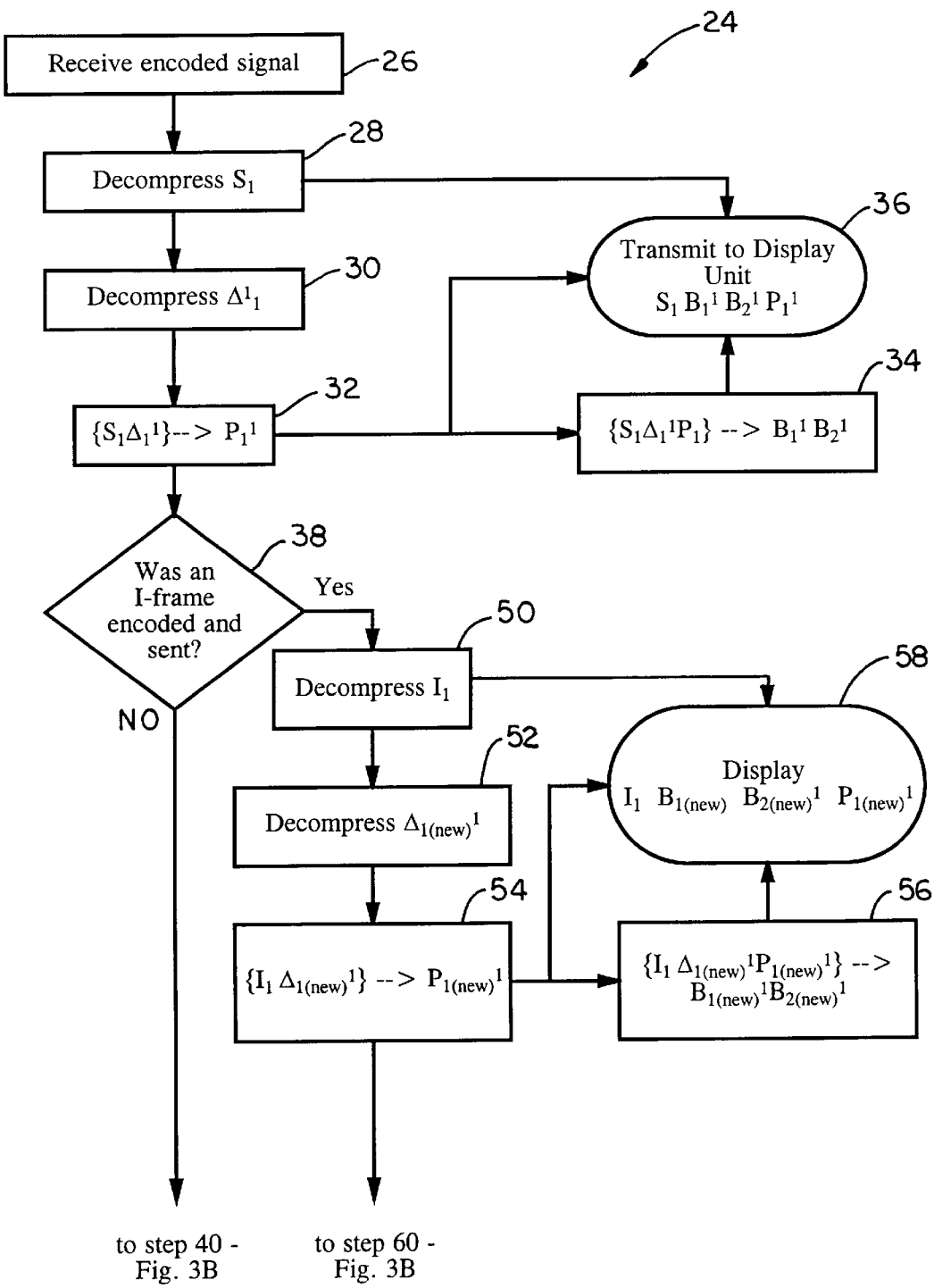
FIGS. 3A and 3B depict a flow diagram illustrating a method of decoding the data transmitted as shown in FIG. 2, further illustrating the method Steps for decoding an I frame.
Figure 3B:
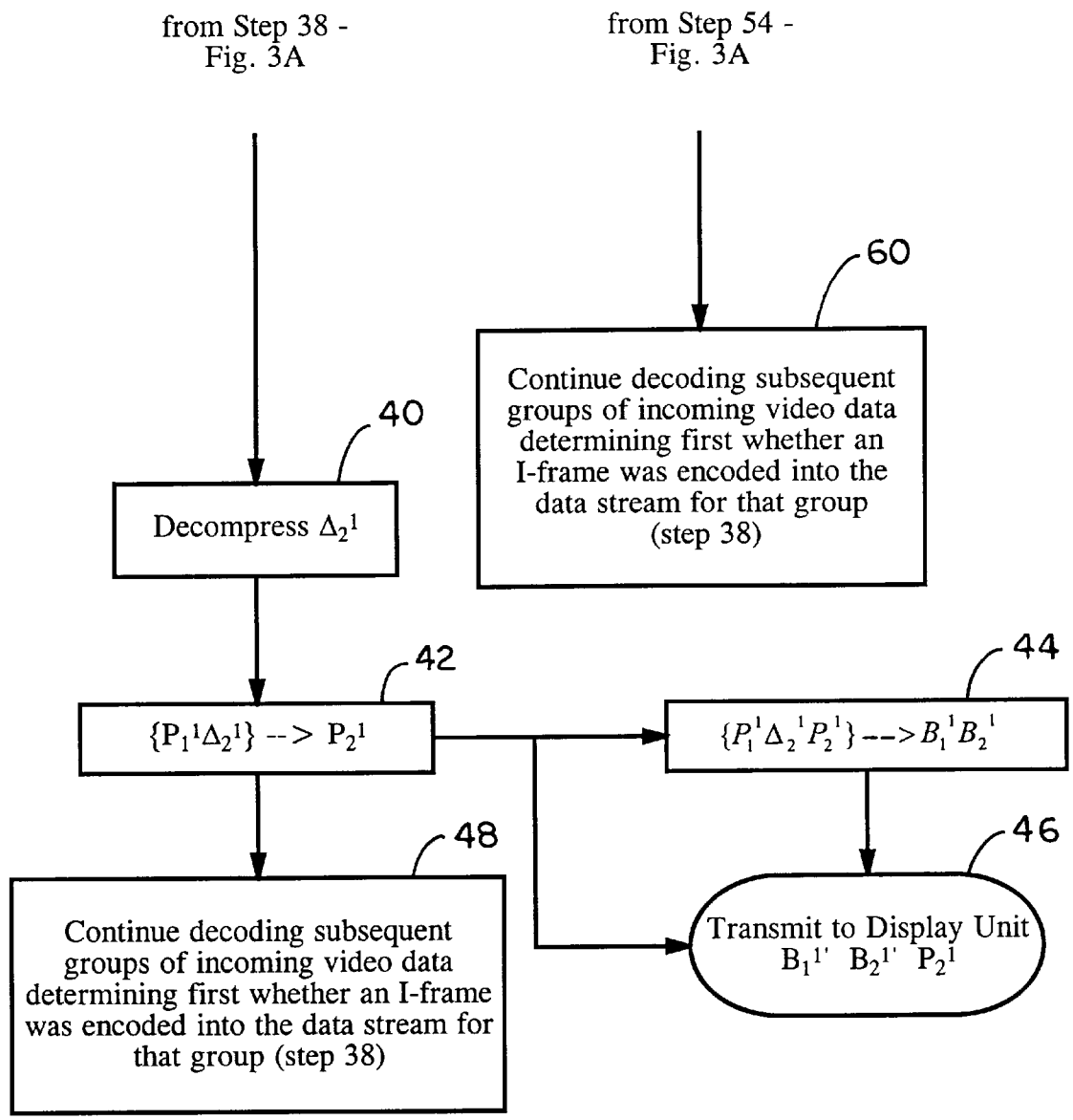
Figure 4:
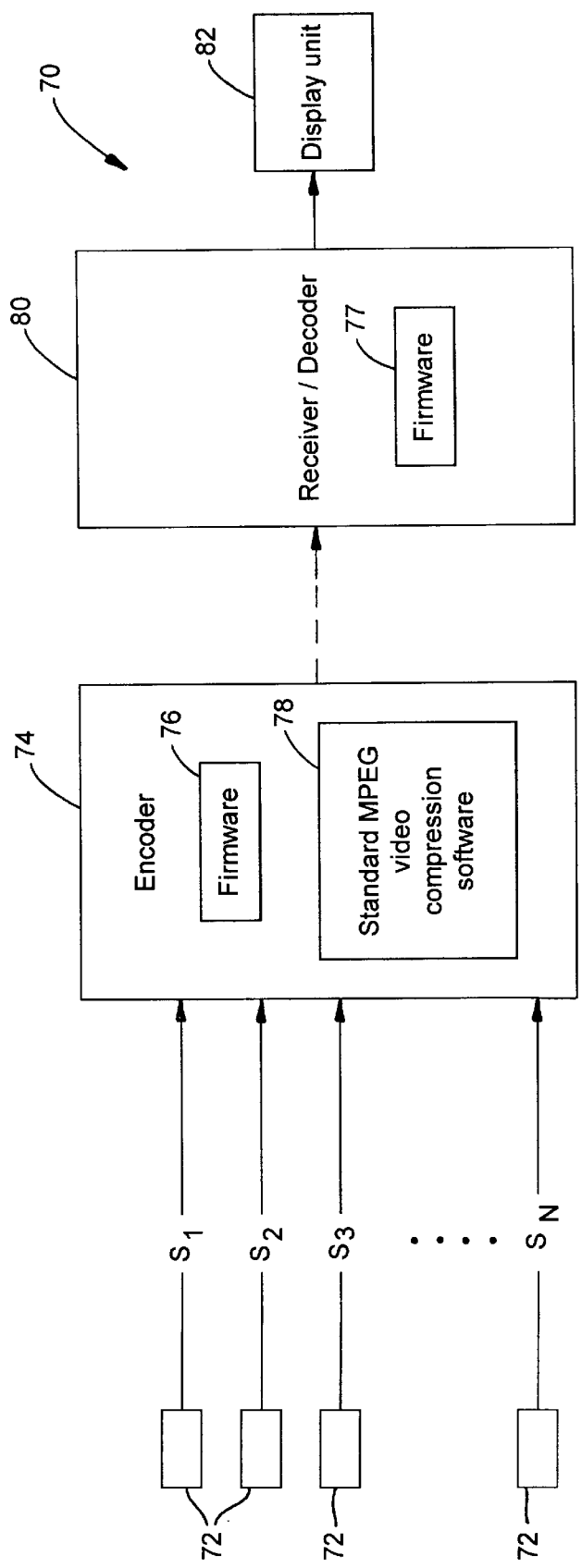
FIG. 4 is a block diagram illustrating a system of the present invention for encoding, transmitting, decoding, and displaying a plurality of channels of video data.

Referring to FIG. 4, a system 70 for encoding multiple channels of video data according to the present invention is shown. System 70 includes an encoder 74 that has multiple inputs for receiving video data signals, $S_1, S_2, \ldots S_N$ from multiple sources or channels 72. Encoder 74 processes the video data signals input from channels 72, preferably in groups comprising a predetermined number of frames from each channel, with system firmware 76. Firmware 76 is preferably artificial intelligence (AI) fuzzy logic software that controls the encoding process, including determining when I-frames should be inserted. The AI/fuzzy logic software achieves high throughput, and consequently higher resolution of the video signals. Encoder 74 also includes software 78 for further compressing particular portions of the encoded video data in accordance with standard video compression techniques, such as MPEG intra-frame video data compression. This additional level of data compression enhances efficient use of available bandwidth without sacrificing video quality.

In certain applications, after encoding at least a portion of the video data from each channel, encoder 74 transmits the resultant signals, in an appropriate sequence, to a receiver/decoder 80 that includes firmware 77 to re-create the video images. After reconstructing the video images of each channel 72 based on the encoded, transmitted signals, decoder 80 transmits the decoded signals to a display unit 82 for viewing by the user.

Figure 5:
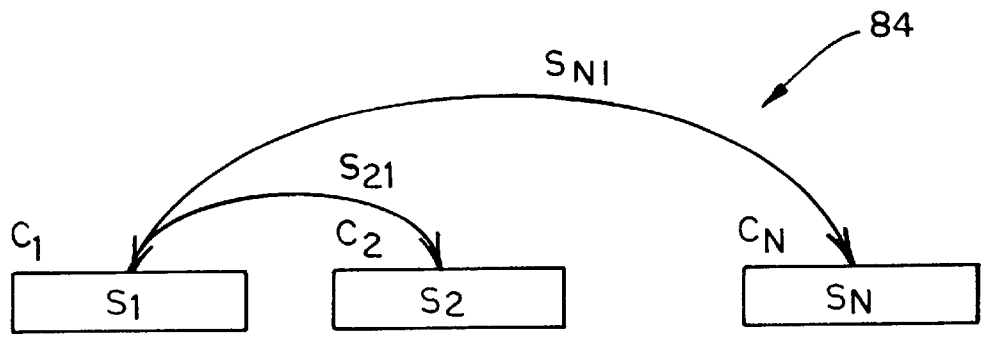
FIGS. 5–10 are schematic diagrams illustrating Steps of a method for encoding multiple channels of video data with the system shown in FIG. 4, in the case that no high motion content is encoded in the sequence.

Turning to FIGS. 5–10, a novel method of encoding multiple channels of video data using a motion estimation technique is shown. In FIG. 5, the encoding method of the preferred embodiment includes a first Step 84 for determining an initial inter-channel motion difference $S_{21}, S_{31} \ldots S_{N1}$ between the initial frames ($S_1, \ldots, S_N$) of each channel $C_1, \ldots, C_N$. In particular, the initial frame $S_1$ of source $C_1$ ($C_1$ being the reference source) is a reference frame from which the differences between it and the first frames $S_2-S_N$ of each of the other sources $C_1-C_N$ are computed. For instance, the differences between the initial frame $S_2$ of source $C_2$ and the reference initial frame $S_1$ are computed, the differences being designated $S_{21}$. Similarly, the differences are computed for each of the other sources up to the Nth source, wherein the differences between the first frame $S_N$ of the Nth source $C_N$ and the reference frame $S_1$ is designated $S_{N1}$.

Because the particular applications contemplated by the present invention utilize multiple sources that provide video data signals that contain a relatively large amount of redundant material, the only information that needs to be transmitted to decoder 80 (FIG. 4) to reconstruct the first frames of all channels is the full video content of reference frame $S_1$ and the differences between that frame ($S_1$) and each of the remaining initial frames $S_2-S_N$. In other words, in the motion estimation method of the present invention, the redundant material among channels does not need to be encoded to reproduce high quality video images. For example, as described in further detail below, decoder 80 can reconstruct these initial images by adding the computed differences $S_{21}$ to the reference frame $S_1$ (both of which are preferably further compressed with standard compression techniques such as MPEG intra-frame decompression) to obtain the first frame $S_2$ of source $C_2$.

Figure 6:
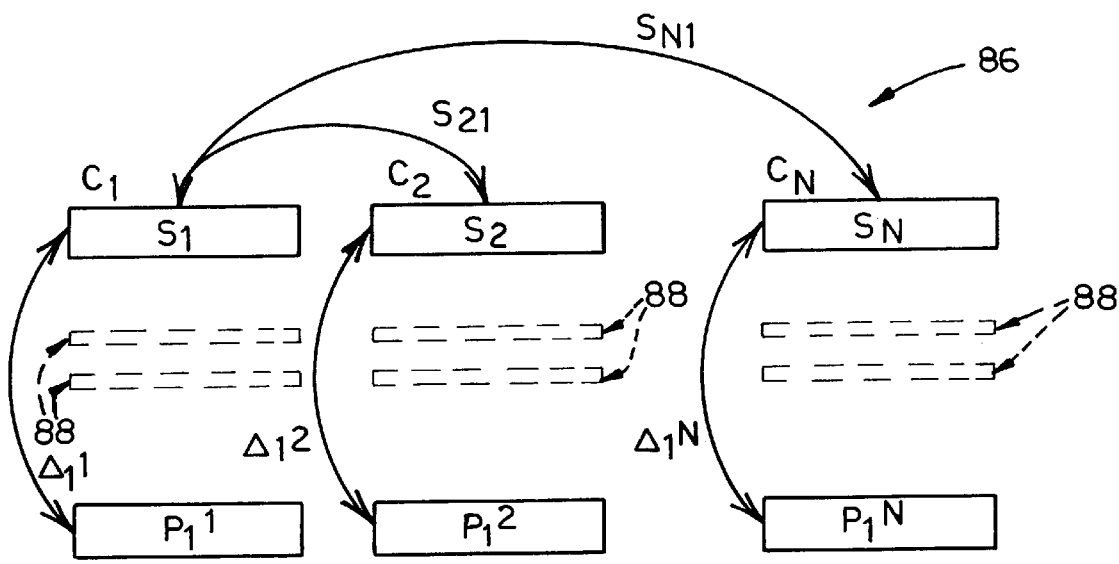

Turning to FIG. 6, a second Step 86 in the encoding method of the preferred embodiment includes determining an intra-channel motion difference ($\Delta_1^1, \ldots, \Delta_1^N$) between the initial frame $S_1-S_N$ of each channel $C_1-C_N$ and a subsequent corresponding frame $P_1^1-P_1^N$, which are actual frames at the encoding end of the system, identified as a "P" frame. This step is similar to the computation made for single channel compression described in the Background. To wit, for reference channel $C_1$, $\Delta_1^1$ is computed by determining the differences between reference initial frame $S_1$ and reference predicted frame $P_1^1$. By computing the motion difference between the initial frame of each of the sources and its associated P frame, only the intra-channel difference has to be encoded because it can be readily added to the initial frame to reconstruct the P frame. Specifically, when decoded, the differences $\Delta_1^1-\Delta_1^N$ are added to the corresponding initial frame $S_1-S_N$ of each of the sources to produce the P frames without ever having to encode the entire video content of each P frame. Notably, the difference signals $\Delta_1^1-\Delta_1^N$ are preferably further compressed using standard compression techniques, such as MPEG intra-frame compression.

Note that, similar to standard single channel video compression using motion estimation, the method of the preferred embodiment skips a predetermined number of frames 88 of each channel, thus further reducing the data to be encoded. The number of skipped frames 88 is typically dependent upon the type of video being compressed such that for a high action video, wherein the differences between successive frames of each channel are relatively many, fewer frames should be skipped because there is a higher risk that significant data may be lost which may compromise video quality. As shown in FIG. 6, two frames 88 are skipped in each channel $S_1-S_N$ such that the P frame is the third subsequent frame after the initial frame (the four frames comprising a "Group").

Figure 7:
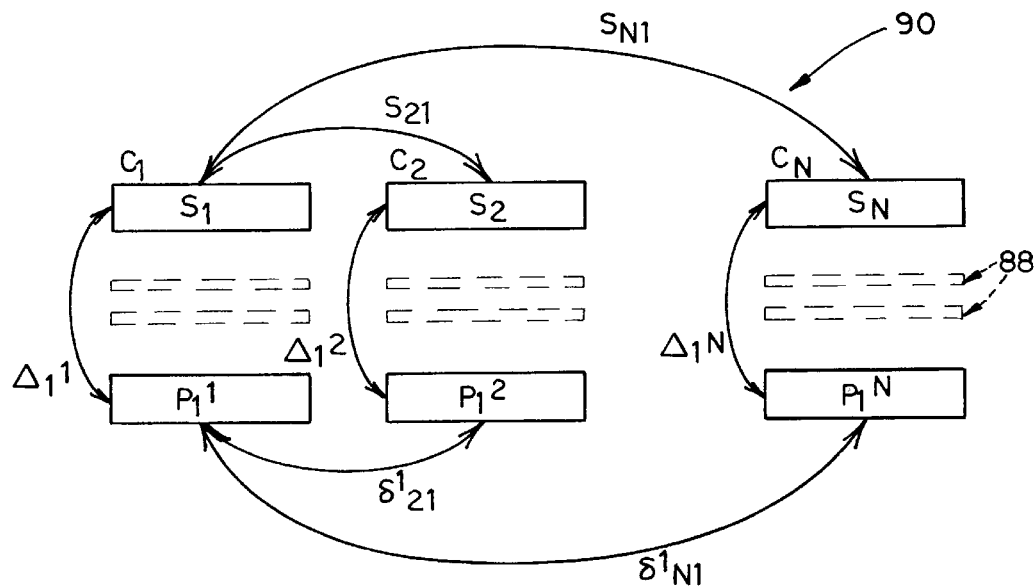

After determining, in succession, each intra-channel difference ($\Delta_1^1-\Delta_1^N$) between the initial frame and an associated P frame for each of the sources (Step 86), the encoder of system 70 executes Step 90, shown in FIG. 7, by determining a predicted inter-channel motion difference ($\delta^1_{21}, \ldots, \delta^1_{N1}$) between the reference predicted frame $P_1^1$ of the reference channel $C_1$ and each of the P frames $P_1^2-P_1^N$ of the other channels $C_2-C_N$. As a result, motion estimation compression is realized between the channels by encoding only the differences $\delta^1_{21}-\delta^1_{N1}$ between the P frames, and not the entire frames. From these predicted inter-channel differences, along with reference predicted frame $P_1^1$ (which must first be reconstructed itself), frames $P_1^2-P_1^N$ can be re-created.

Figure 8:
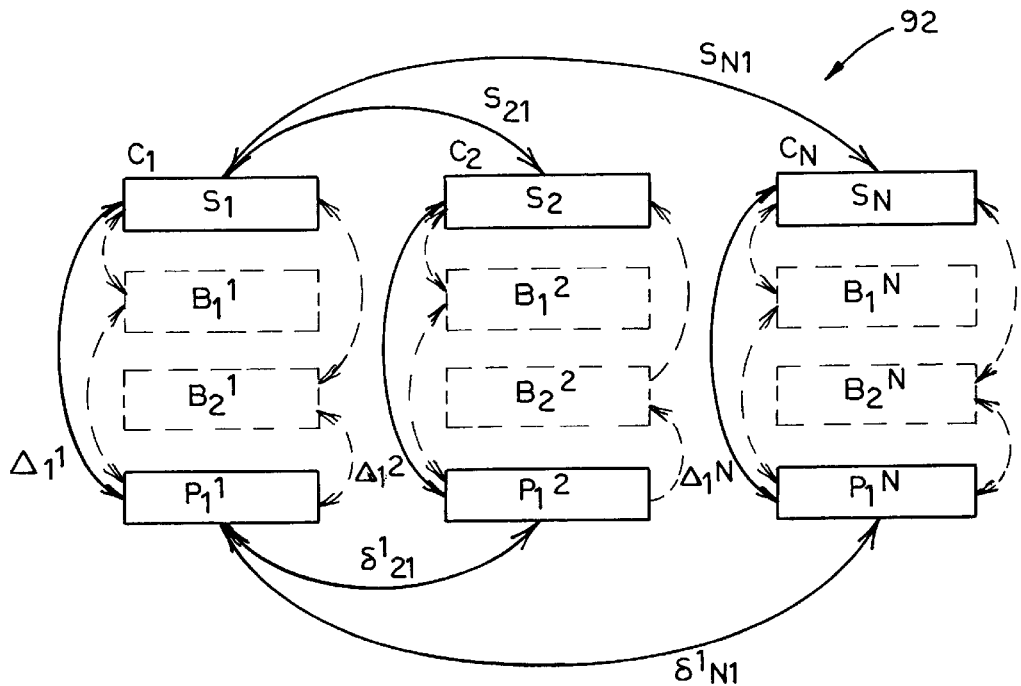

Next, tuning to FIG. 8, the encoder executes Step 92 by computing a number of predicted "B" frames for each channel $C_1-C_N$ corresponding to the number of skipped frames 88, the "B" frames being estimated "filler" frames for skipped frames 88. As indicated by the double arrows shown in phantom in FIG. 8, the video data pertaining to the reference frame $S_1$ and the associated P frame, $P_1^1$, is used to create B frames, $B_1^1$ and $B_2^1$ of channel $C_1$. In particular, based on the relationship of the video data of initial reference frame $S_1$, the associated frame $P_1^1$, and the differences between these two frames $\Delta_1^1$, the first pair of B frames corresponding to the reference channel can be computed.

Although they are entirely predicted, the B-frames correlate to skipped frames 88 with a reasonable degree of accuracy. The more particular details of encoding the B frames are known by those skilled in the art and do not require further discussion here. Also, as discussed previously, if transmitted, only highly encoded skeletal forms of the B frames are sent, thus eliminating the need to encode any significant data pertaining to skipped frames 88. In Step 92, the encoder successively computes these B frames $B_1^1 B_2^1, \ldots, B_1^N B_2^N$ for each source thus completing the initial encoding of the first group of frames.

When encoded, the P frames are approximately ten times more compressed than the reference initial frame (10:1 compression ratio), and the B frames are approximately twenty times more compressed than the reference initial frame. (20:1 compression ratio). Note that the initial group of frames, shown in FIGS. 6–8, including initial frames $S_1$–$S_N$, the skipped frames and the P frames $P_1^1$–$P_1^N$ of each respective channel collectively comprise the first sequence of frames (Group I), and will hereinafter be referred to as such.

After the Group I frames have been encoded as shown in FIGS. 5–8, encoder 74 utilizes firmware 76 (FIG. 4) to determine whether any of the series of frames of the first group for each channel exhibit a significant amount of motion, i.e., whether the difference between the P frames $P_1^1$–$P_1^N$ and the initial frames $S_1$–$S_N$ for any channel $C_1$–$C_N$ reaches or exceeds a predetermined threshold $E_0$ (as described in the above-referenced pending application which has been incorporated by reference herein), thus calling for an I-frame to be encoded, and the encoding process to be restarted beginning with Step 84. On the other hand, if $E_0$ is not exceeded by any intra-channel difference, then the intra-channel differences for Group II, ($\Delta_2^1$–$\Delta_2^N$), are encoded and the encoding process continues for each Group, as described above, until $E_0$ is exceeded by any subsequent intra-channel difference.

Notably, the threshold $E_0$ is preset depending upon the content or type of the video such as action, or nature. For example, due to significant differences in subsequent frames in an action video, if the threshold $E_0$ is set too high and a new I-frame is not encoded in the signal sequence as a result (i.e., even though the situation demands it), significant data may be lost in the encoding of only predicted frames (P or B), which by definition include less than a full frame of information.

In another embodiment of the invention, not only can an intra-frame difference $\Delta_x^x$ trigger the encoding of an I-frame but an initial inter-frame difference $S_{xx}$, or a predicted inter-frame difference $\delta^x_{xx}$ can trigger the insertion of an I-frame. When an initial inter-frame difference reaches a second predetermined threshold $E_0'$, or when a predicted inter-frame difference reaches a third predetermined threshold $E_0''$, then an I-frame can be encoded in the sequence. Also, as mentioned previously, firmware 76 of encoder 74 (FIG. 4) is preferably implemented using artificial intelligence (AI)/fuzzy logic software to provide a smart system of I-frame insertion.

Note that, as described in the incorporated application, the S and P frames can be segmented into search blocks or segments and an intra-channel difference can be computed for corresponding blocks of the S & P frames of each channel. The intra-channel block differences (block differences), each corresponding to a particular channel can then be accumulated for that channel and compared to $E_0$ to determine whether to encode an I-frame for either each of the channels or for that channel only.

According to a further aspect of the invention, a "spatial distribution of error" method may be implemented with specially designed algorithms in the firmware 76 to determine the position of the blocks in the frames. If frames are located in an unimportant area of the frame, the encoding process will continue without inserting an I-frame, even though the intra-channel difference associated with that particular channel warrants the insertion of an I-frame. Using one method, the search blocks can be assigned a predetermined weighted value which will be used to determine whether its associated intra-channel difference is significant. If so, the method will accumulate the significant intra-channel block differences to determine, for that channel, whether an I-frame should be inserted. The method of determining the spatial distribution of differences is preferably implemented with AI or fuzzy logic and provides precise tuning of I-frame insertion.

Figure 9:
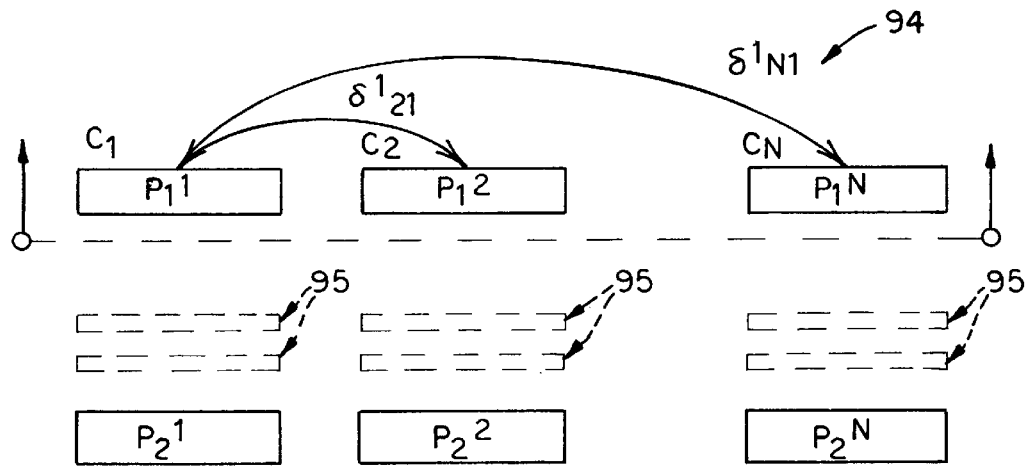

In the event that threshold $E_0$ is not exceeded by the accumulated error (i.e., an I-frame is not encoded), the encoding method executes Step 94 shown in FIG. 9 to begin encoding the Group II frames, including using the predicted reference frame $P_1^1$ of Group I as the reference initial frame of Group II. More specifically, because in this case an entire new I-frame does not need to be sent by encoder 74, the existing P frame signals $P_1^1$–$P_1^N$ for each respective channel $C_1$–$C_N$ are retained, and take the place of the initial frames $S_1$–$S_N$ of Group I (FIGS. 5–8) in the encoding process. Further, the third subsequent frame of reference channel $C_1$, which now is the seventh frame, is predicted according to known methods and becomes the Group II reference predicted frame $P_2^1$.

The difference between the encoding process for the Group II frames and that described above with respect to encoding the Group I frames is that Step 84, shown in FIG. 5 is no longer performed because the initial frames of Group II are the P frames $P_1^1$–$P_1^N$ of Group I (described below). In other words, the differences $\delta^1_{21}$–$\delta^1_{N1}$ between the $P_1^1$ frame of the reference channel $C_1$ and each of the P frames of the remaining channels will have been encoded and saved in memory (for example, in decoder memory). As a result, $P_1^1$–$P_1^N$ will be accessible when reconstructing the Group II frames.

Figure 10:
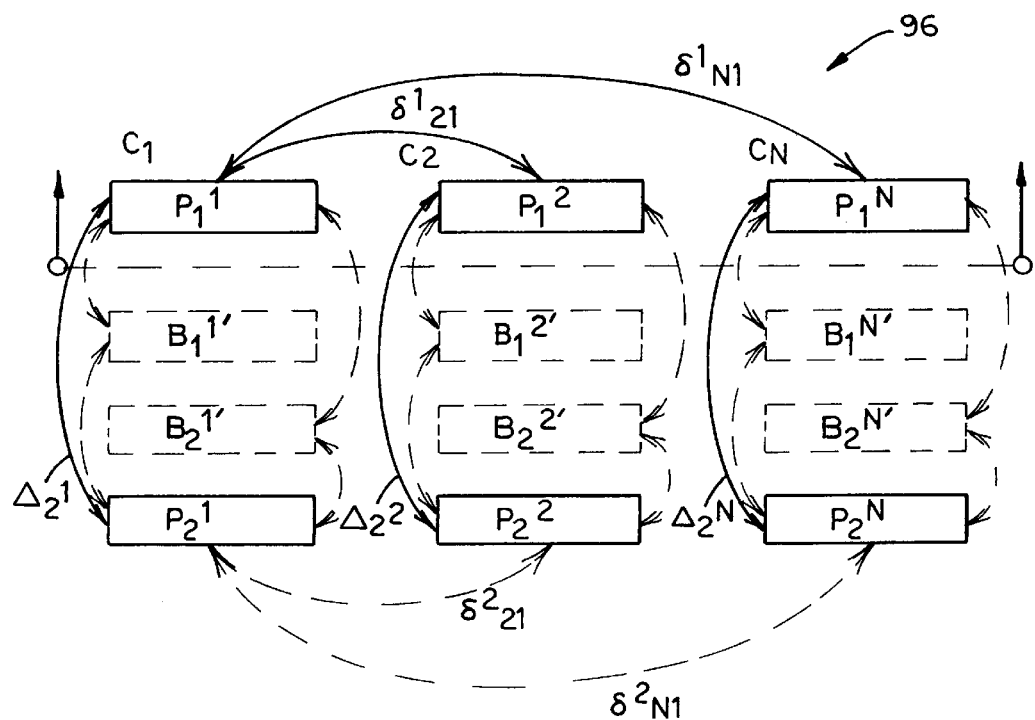

The execution of the remaining steps of the encoding process shown in FIG. 6 (Step 86), FIG. 7 (Step 90), and FIG. 8 (Step 92) are collectively shown in FIG. 10 as Step 96 wherein the new initial reference frame from channel $C_1$ is frame $P_1^1$ and the new P frames are $P_2^1$, . . . $P_2^N$, preferably the seventh frames of each channel $C_2$–$C_N$. From these frames, new intra-channel motion differences $\Delta_2^1$, . . . , $\Delta_2^N$ as well as new inter-channel motion differences $\delta^2_{21}$, . . . , $\delta^2_{N1}$ can be determined and encoded. In addition, the B frames associated with Group II are also created as fillers for skipped frames 95 (FIG. 9). (Note that the notation convention used in FIGS. 9 and 10 comprising a dashed horizontal line and upwardly and perpendicularly extending arrows disposed on either end of the dashed horizontal line indicates that the information generally surrounded thereby does not have to be encoded because it was encoded in the immediately preceding group.)

This encoding process continues as set forth above in Steps 84–86 for each Group which, in this case, consists of N channels having four frames each. In each respective Group, the P frames, and the differences between them, encoded as described above, serve as the initial reference frames for the next successive Group as long as the difference does not exceed the preset threshold $E_0$. When system firmware 76 of encoder 74 (FIG. 4) determines that the image correlation falls below the threshold value $E_0$, i.e., when firmware 76 determines that the successive frames exhibit a sufficient amount of motion, an I-frame is inserted. If image correlation remains above threshold $E_0$, each of the current frames of sources $C_1$–$C_N$ is retained and the encoding of the frames restarts at Step 84 (FIG. 5).

Figure 11:
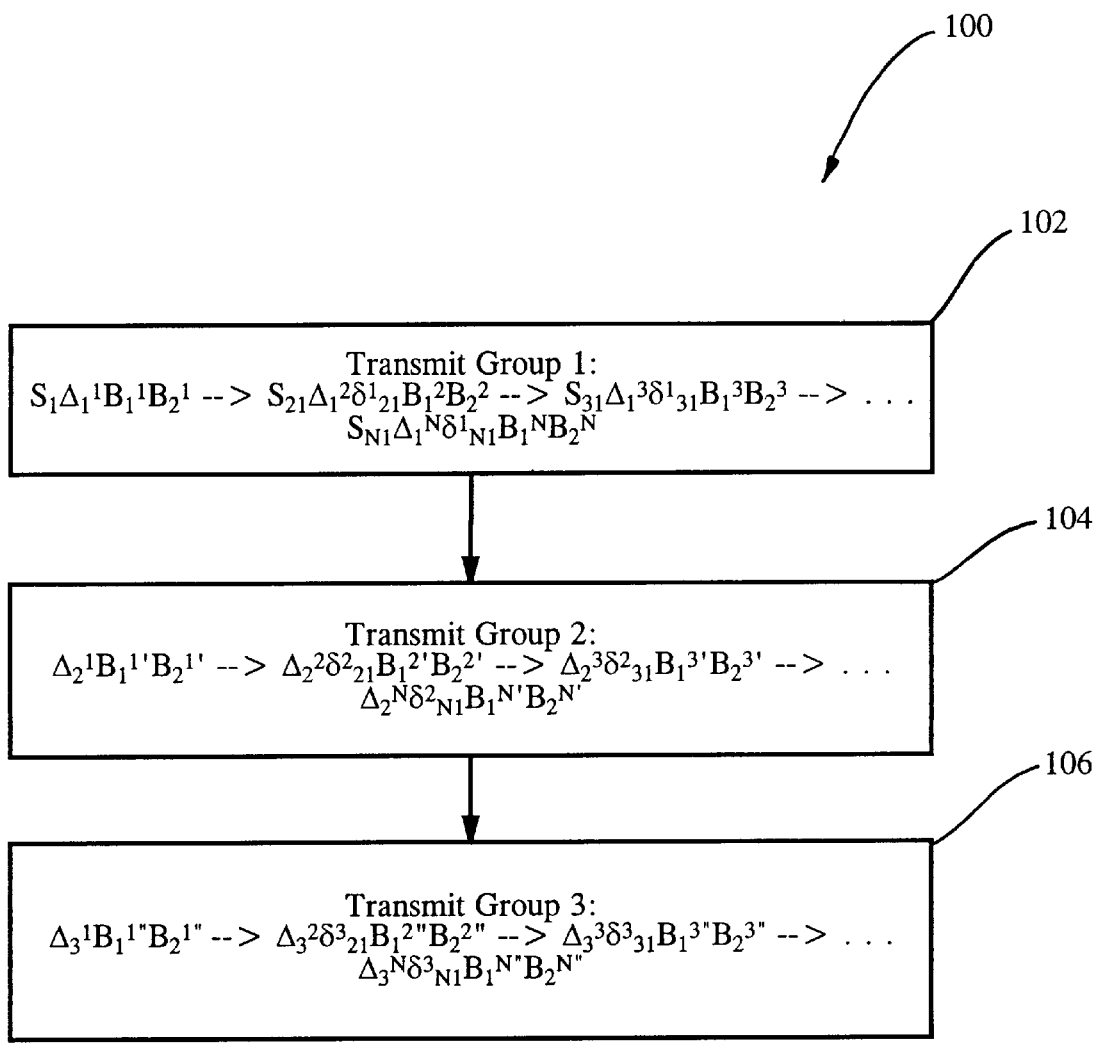
FIG. 11 is a flow diagram illustrating a transmission sequence according to the present invention for transmitting data encoded as shown in FIGS. 5–10.

Turning to FIG. 11, once the video data is encoded as described above, the encoded signals can be transmitted to the decoder (at least partially) in a sequence 100. Specifically, Group I is transmitted including, initially, the reference channel data signals. More specifically, the encoder transmits a signal indicative of the entire video content of the initial reference frame $S_1$, along with the differences $\Delta_1^1$ between $S_1$ and its associated P frame $P_1^1$ (FIGS. 6–8) and highly encoded signals (typically, skeletal forms) representative of the predicted B frames, $B_1^1$ and $B_2^1$. Note that because $P_1^1$ can be re-created from $S_1$ and $\Delta_1^1$ it does not have to be sent. However, to lessen the number of differences computations, $P_1^1$ can be transmitted in its entirety without significantly increasing the bandwidth of the sequence signal. Nevertheless, in the preferred embodiment, the $P_1^1$ frame is not transmitted in its full form because it can be readily re-created from information ($S_1$ and $\Delta_1^1$) that must be sent anyway without compromising video quality.

Thereafter, the remaining encoded channels of Group I are transmitted to the decoder. For example, encoded information for channel two is transmitted including $S_{21} \Delta_1^2 \delta_{21}^1 B_1^2 B_2^2$ which will be used to re-create initial frame $S_2$, and frames $B_1^2$, $B_2^2$ and $P_1^2$. The transmission of Group I signals continues for each of the N channels whereby the final sequence transmitted is $S_N^1 \Delta_1^N \delta_{N1}^1 B_1^N B_2^N$.

Note that the encoder/transmitter 74 of FIG. 4 preferably utilizes parallel processing such that while earlier encoded channels of data are being transmitted, the subsequent channels of video data are being encoded. Further, although the method has been described as encoding and transmitting one channel of data at a time, depending upon the application, channels ($C_1$–$C_N$) can be encoded/transmitted in pairs to increase throughput.

Thereafter, Groups II and III, 108 and 110 respectively, are transmitted to the decoder in the same way as Group I. Of course, there are many more Groups of video data that will make up the entire video, and each is encoded/transmitted as described above including, of course, the insertion of I-frames when necessary.

Figure 12A:
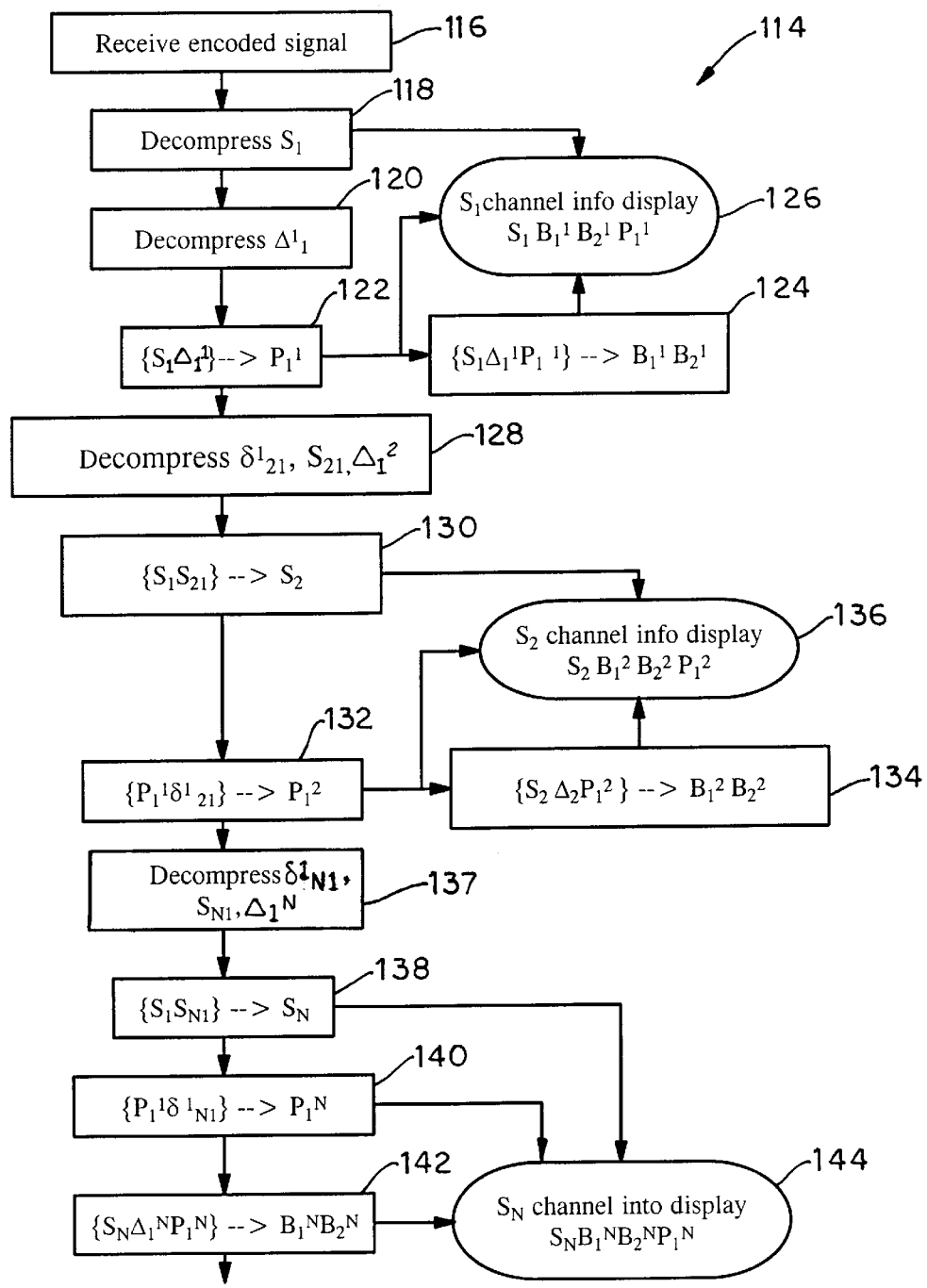
FIG. 12 is a flow diagram illustrating a method of decoding the video data transmitted as shown in FIG. 11, further illustrating the Steps of the decoding method when an I frame is encoded and transmitted.
Figure 12B:
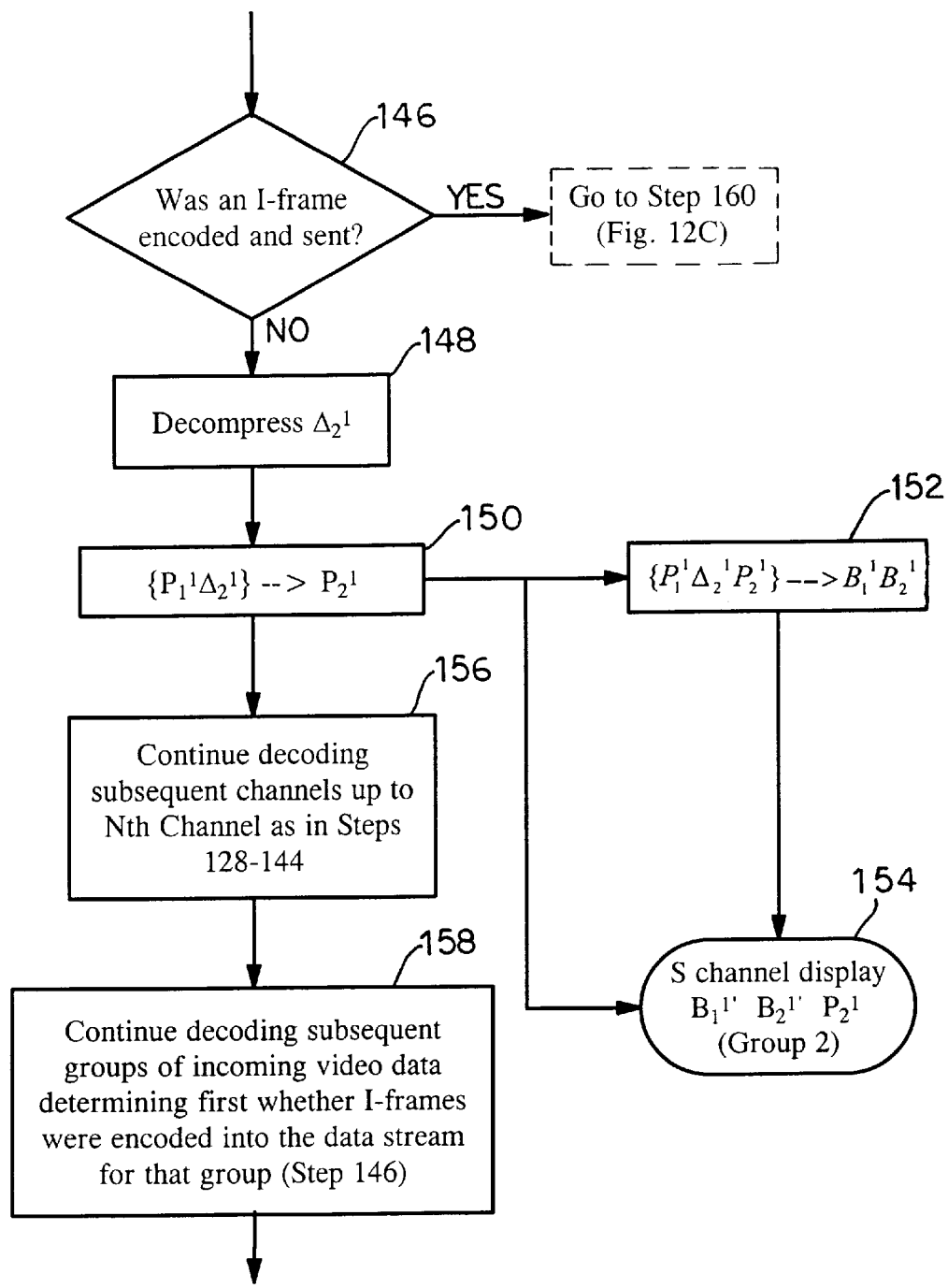

Turning to FIG. 12, a flow chart depicting the Steps of a method 114 utilized by receiver/decoder 80 (FIG. 4) to re-create the video for each of the multiple channels is shown. After receiving the signals (Step 116), method 114 executes Step 118 to initially decompress the initial frame $S_1$, i.e., the reference initial frame (including its full video content as discussed earlier). Note that, except for the signals indicative of the B frames, the encoder typically compresses the signals with standard video compression techniques used in MPEG intra-frame compression (FIG. 4 at 78), prior to the transmission. This data compression is in addition to the novel compression methods of the present invention. In Step 118, therefore, method 114 utilizes corresponding standard decompression techniques.

Next, the encoded intra-channel difference between the $S_1$ and $P_1^1$ frames, i.e., signal $\Delta_1^1$, is decompressed according to standard decompression methods in Step 120. Thereafter, method 114 proceeds to re-create, in Step 122, the P frame associated with the first channel of Group I, $P_1^1$, by utilizing the decompressed versions of $S_1$ and $\Delta_1^1$; more specifically, by summing $\Delta_1^1$ and $S_1$. Alternatively, as mentioned above, the entire $P_1^1$ frame can be compressed using conventional compression methods, transmitted in encoded form, and decompressed accordingly. Nevertheless, the former method of reconstructing $P_1^1$ is preferred. Thereafter, method 114 re-creates predicted frames, $B_1^1$ and $B_2^1$ in Step 124 using the relationships between $S_1$, $\Delta_1^1$, and $P_1^1$. In Step 126, method 114 transmits reference frames S1, and re-created frames $P_1^1$, $B_1^1$, $B_2^1$ to the display unit 82 (FIG. 4) for displaying frames in the order indicated, i.e., $S_1 B_1^1 B_2^1 P_1^1$.

Continuing with the Group I sequence, method 114 decompresses the encoded information for channel 2, including the $\delta_{21}^1$, $\Delta_1^2$ and $S_{21}$ signals in Step 128 using, e.g., standard MPEG decompression techniques. (Note that the $\delta$, $\Delta$, and S may also be referred to as a collection of signals). Then, in Step 130, reference initial frame $S_1$ and the initial inter-channel difference between $S_1$ and $S_2$ ($S_{21}$), are used to re-create the initial frame $S_2$ of the second channel. In this novel fashion, method 114 re-creates $S_2$ without having to send the entire video content of the $S_2$ frame. Again, this is possible and advantageous because there is a significant amount of redundant information among the data of corresponding frames of the various channels.

Then, the predicted reference frame for Group I, $P_1^1$, and the inter-channel difference $\delta_{21}^1$ between it and the P frame for channel 2 ($P_1^2$), are used to re-create the P frame ($P_1^2$) for channel two in Step 132. By using decompressed $\Delta_1^2$ (representing the intra-channel difference between the S and P frames of the second channel in Group I), in conjunction with decoded frames $S_2$ and $P_1^2$, method 114 re-creates predicted frames $B_1^2$, $B_2^2$ in Step 134. $S_2 B_1^2 B_2^2 P_1^2$ are then transmitted in Step 136 to the display unit.

This process continues for each of the channels up to the Nth channel, whereby, in Step 137, method 114 decompresses $\delta_{N1}^1$, $S_{N1}$, and $\Delta_1^N$ using standard decompression techniques, and creates $S_N$ using both $S_1$ and the encoded differences between $S_N$ and $S_1$, $S_{N1}$, in Step 138. Thereafter, the P frame of the Nth channel, $P_1^N$ is created in Step 140 by summing the predicted inter-channel difference $\delta_{N1}^1$ with $P_1^1$. Then, method 114 combines $\delta_{N1}^1$ and the just created frames, $S_N$ and $P_1^N$, to create $B_1^N$ and $B_2^N$ in Step 142. To complete decoding of the Group I signals, method 114 transmits, in Step 144, the signals to the display unit such that the signals may be displayed in the following order: $S_N B_1^N B_2^N P_1^N$. In sum, the present invention allows corresponding frames of subsequent channels to be reconstructed from encoded frames of a reference channel and associated encoded inter-channel and intra-channel differences without having to encode and transmit full video content of the frames.

Once the Group I frames have been decoded, method 114 executes a particular sequence of steps depending on whether the accumulated error between the current frame and the next predicted frame exceeds the preset threshold $E_0$, i.e., depending upon whether an I-frame was encoded and sent. (Step 146 in FIG. 12B) Turning to FIG. 12B, in the event that an I-frame was not encoded and sent, the P frame of the first group, $P_1^1$, is the new initial reference frame for channel 1. Unlike the initial reference frame ($S_1$) of Group I, the $P_1^1$ signal representing the new initial reference does not need to be decoded and displayed because it was stored in memory when the Group I signals (including predicted reference frame $P_1^1$) were decoded. In Group II, the $P_1^1$ frame is only used as a reference frame for corresponding frames, i.e., it is not displayed again.

Method 114 next reconstructs the new predicted frame, $P_2^1$. Because two frames are skipped, the new P frame is the seventh frame. Method 114 decompresses $\Delta_2^1$ in Step 148 and then, in Step 150, creates $P_2^1$ by combining the new reference initial frame $P_1^1$ with the $\Delta_2^1$ signal. $P_2^1$ is then combined with $P_1^1$ and $\Delta_2^1$ in Step 152 to create the new predicted frames $B_1^{1'} B_2^{1'}$. Method 114 then transmits the new reconstructed P frame, $P_2^1$, and the predicted frames $B_1^{1'}$ and $B_2^{1'}$ to the display unit in Step 154 to display the frames of the reference channel as follows: $B_1^{1'} B_2^{1'} P_2^1$. These frames are the fifth, sixth and seventh frames of channel one, $C_1$.

In Step 156, the frames of subsequent channels, up to and including the Nth channel, are decoded as in Steps 128–144.

Finally, in Step 158, method 114 continues to decode subsequent Groups of encoded video data as described above, determining first whether I frames were encoded for that Group (Step 146).

Figure 12C:
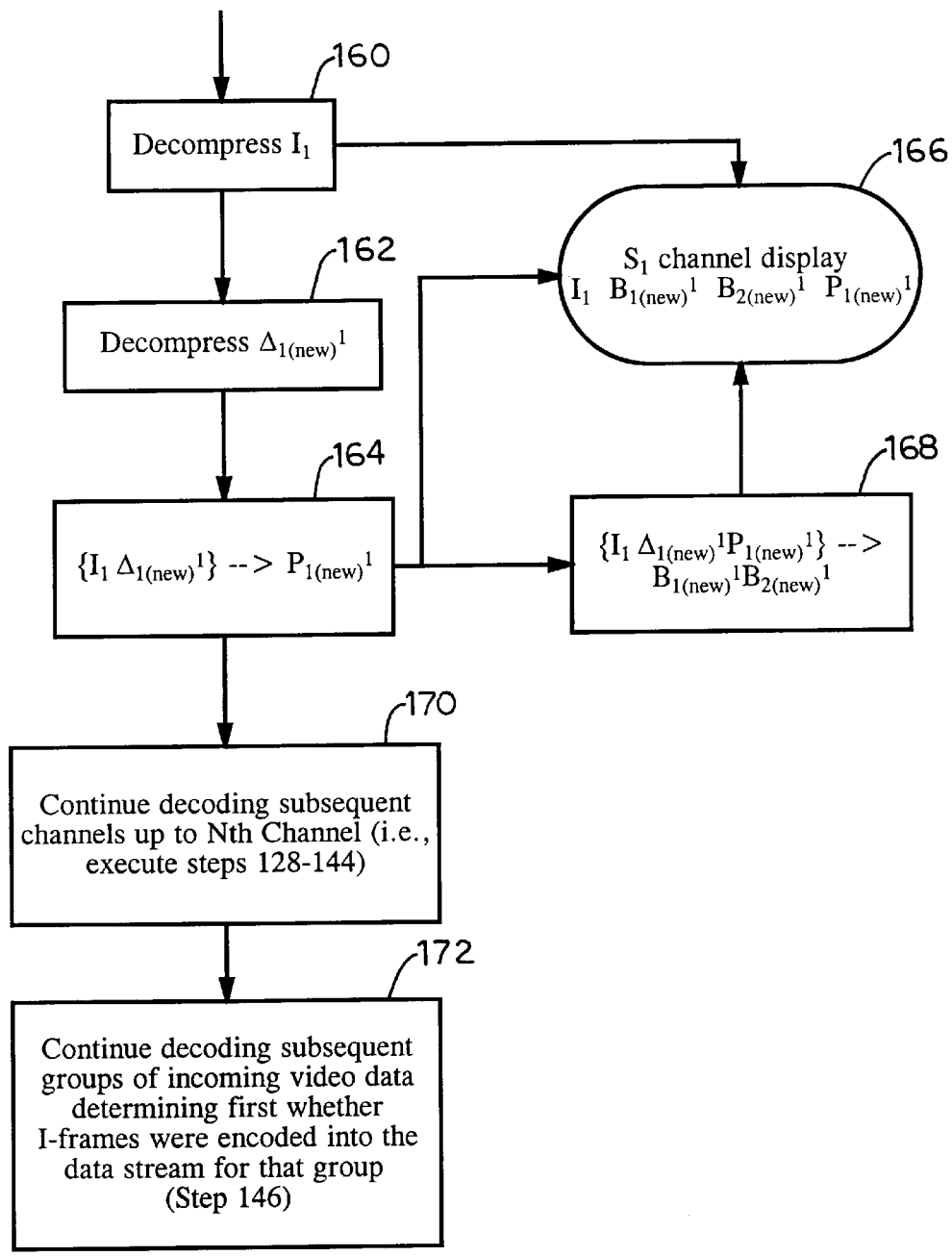

On the other hand, in the event that an I-frame was encoded and sent for each channel (which will occur if an intra-channel accumulated difference for any channel reaches or exceeds the preset threshold $E_0$ and, in the case where the spatial distribution of error method is implemented, considering the weighted value of the blocks), method 114 initially decompresses the I frame, $I_1$ (the new reference initial frame—typically the full video content of which is encoded), of reference channel $C_1$ with standard decompression techniques in Step 160 of FIG. 12C. Similarly, method 114, in Step 162, decompresses $\Delta_{1(new)}^1$, the differences between the new reference predicted frame $P_{1(new)}^1$ and the new reference initial frame, $I_1$. Then, method 114, in Step 164, creates $P_{1(new)}^1$ by combining $I_1$, and $\Delta_{1(new)}^1$. Next, in Step 168, the method combines $I_1$, $\Delta_{1(new)}^1$ and $P_{1(new)}^1$ to re-create predicted frames $B_1$ (new)$^1$ and $B_2$ (new)$^1$. Method 114 then transmits the decoded signals to the display unit in Step 166 to display the frames in the following order: $I_1$ $B_{1(new)}^1$ $B_{2(new)}^1$ $P_{1(new)}^1$.

Method 114 thereafter continues decoding subsequent channels up to the Nth channel as in Steps 128–144. And, in Step 172, method 114 continues to decode subsequent groups of incoming video data determining first whether I frames were encoded for that Group or whether the previously created P frames should be the new initial frames for each channel (Step 146).

Although the methods of the present invention have been described in conjunction with compressing video data, the techniques described herein could be used to compress other types of signals. For example, multi-language versions of motion pictures could include multiple of channels of data, each corresponding to a different language version of the movie. It is possible to cross correlate the information of each such channel using the techniques of the present invention to compress the data for storage or transmission.

Various modes of carrying out the invention are contemplated as being within the scope of the following claims, which particularly point out and distinctly claim the subject matter which is regarded as the invention.

What is claimed is:

1. A method of compressing a plurality of channels of video, said method comprising the steps of:
    encoding a group of video frames including a predetermined number of consecutive frames of each channel, said encoding step including the substeps;
        (a) taking an initial frame of each channel, including a reference initial frame of a reference channel;
        (b) predicting a subsequent frame of each channel including a reference predicted frame, each said predicted frame corresponding to one of said initial frames;
        (c) determining an intra-channel actual difference between each said initial frame and said corresponding predicted frame;
        (d) determining an initial inter-channel difference between said reference initial frame and each said initial frame of the other channels by subtracting said reference initial frame from each said initial frame of the other channels; and
        (e) determining a predicted inter-channel difference between said reference predicted frame and each said predicted frame of the other channels.

2. The method of claim 1, said encoding step further including the substeps:
    (f) comparing each said intra-channel difference to a predetermined threshold; and
    (g) if any said intra-channel difference reaches said threshold, inserting an I-frame as the next subsequent frame of the channel associated with that intra-channel difference.

3. The method of claim 1, said encoding step further including the substeps:
    (f) comparing each said intra-channel difference to a predetermined threshold; and
    (g) if any said intra-channel difference reaches said threshold, inserting an I-frame as the next subsequent frame of each channel.

4. The method of claim 3, said encoding step further including the substeps:
    (h) comparing each said initial inter-channel difference to a second threshold value;
    (i) comparing each said predicted inter-channel difference to a third threshold value; and
    (j) inserting an I-frame as the next subsequent frame of each channel if any said initial inter-channel difference reaches said second threshold, or if any said predicted inter-channel difference reaches said third threshold value.

5. The method of claim 4, further including the step of repeating said encoding steps (b)–(j) for encoding a plurality of said group of frames, said groups being subsequent to one another.

6. The method of claim 5, wherein said number is four, and the fourth frame is said predicted frame.

7. The method of claim 4, wherein said encoding steps (a)–(j) are implemented with artificial intelligence or fuzzy logic software.

8. The method of claim 1, further including the steps of:
    generating a signal indicative of said reference initial frame, and a signal indicative of said intra-channel difference for said reference channel;
    generating a collection of signals, for each channel, except said reference channel, including (1) a signal indicative of a corresponding initial inter-channel difference, (2) a signal indicative of a corresponding intra-channel difference, and (3) a signal indicative of a corresponding predicted inter-channel difference; and
    transmitting said reference initial frame signal, said reference intra-channel difference signal and each said collection of signals to a decoder.

9. The method of claim 8, further including the step of compressing said reference initial frame signal, said reference intra-channel difference signal and each said collection of signals with standard MPEG compression techniques prior to said transmission step.

10. The method of claim 9, wherein said predicted frames are ten times more compressed than said reference initial frame.

11. The method of claim 8, further including the steps of:
    reconstructing in said decoder:
        (1) said reference initial frame from said reference initial frame signal;
        (2) each said initial frame, except said reference initial frame, from said reference initial frame and a corresponding one of said initial inter-channel difference signals;
        (3) said reference predicted frame from said reference initial frame and said reference intra-channel difference signal; and (4) each said predicted frame, except said reference predicted frame, from said reconstructed reference predicted frame and a corresponding one of said predicted inter-channel difference signals.

12. The method of claim 11, further including the steps of:
transmitting said reference initial frame and each said reconstructed frame to a display unit; and
displaying said reference initial frame and said reconstructed frames.

13. The method of claim 10, wherein said reconstructing step is implemented with artificial intelligence or fuzzy logic software.

14. A method of compressing a plurality of channels of video which contain data pertaining to a common environment, including a reference channel, said method comprising the steps of:
encoding a group of video frames, said group including a predetermined number of frames of each channel, said encoding step including the sub-steps of:
(a) taking an initial frame of each channel;
(b) predicting a subsequent frame of each channel, each said predicted frame corresponding to one said initial frame;
(c) determining an intra-channel actual difference between each said initial frame and said corresponding predicted frame;
(d) comparing each said intra-channel difference to a threshold value; and
(e) inserting an I-frame as the next subsequent frame of each channel if any said intra-channel difference, independent of said intra-channel difference associated with any other channel, reaches said threshold value.

15. The method of claim 14, further including the step of segmenting each said initial frame and each said corresponding predicted frame into search blocks.

16. The method of claim 15, further including the step of:
determining an actual block difference between each block of said initial frame and a corresponding block of said corresponding predicted frame.

17. The method of claim 16, further including the steps of:
accumulating, for each channel, each said block difference corresponding to that channel;
comparing each said accumulated block difference to a threshold value; and
inserting an I-frame as the next subsequent frame of each channel if any of said accumulated block difference reaches said threshold value.

18. The method of claim 16, further including the step of assigning a weighted value to each said block difference.

19. The method of claim 18, further including the steps of:
determining, based on said weighted value associated with each said block difference, whether each said block difference is significant;
accumulating, for each channel, each said significant block difference;
comparing each said accumulated block difference to a threshold value; and if any accumulated block difference reaches said threshold, inserting an I-frame as the next subsequent frame for that channel.

20. The method of claim 18, further including the steps of:
determining, based on said weighted value associated with each said block difference, whether each said block difference is significant;
accumulating, for each channel, each said significant block difference;
comparing each said accumulated block difference to a threshold value; and if any accumulated block difference reaches said threshold, inserting an I-frame as the next subsequent frame for each channel.

21. The method of claim 14, wherein said number equals four, and the fourth frame is said predicted frame.

22. The method of claim 14, further including the steps of:
repeating steps (b)–(e) of said encoding step for encoding a plurality of said group of frames, said groups being subsequent to one another.

23. A method of encoding a plurality of channels of video which contain data pertaining to a common environment, each channel having a plurality of successive frames, the method comprising the steps of:
taking an initial frame of each channel, including a reference channel;
predicting a subsequent frame of each channel, each said predicted frame corresponding to one of said initial frames;
determining an intra-channel difference between each said initial frame and said corresponding predicted frame;
determining an initial inter-channel difference between said reference initial frame and each of the other initial frames by subtracting said reference initial frame from each said initial frame of the other channels;
determining a predicted inter-channel difference between a reference predicted frame of said reference channel and each said predicted frame of the other channels by subtracting said reference predicted frame from each said predicted frame of the other channels;
transmitting each said intra-channel difference and each said initial inter-channel difference, each said predicted inter-channel difference, and said initial reference frame to a decoder for reconstructing the video.

24. A method of compressing a plurality of channels of video, said method comprising the steps of:
determining an intra-channel difference between a current frame and a predicted frame of each channel;
inserting an I-frame as the next subsequent frame after the current frame in each channel if any said intra-channel difference, independent of said intra-channel difference associated with any other channel, reaches a predetermined threshold.

25. A method of compressed video transmission for a plurality of video channels which obtain data from a common environment, the method comprising the steps of:
taking an initial frame of each channel;
segmenting each said initial frame into blocks;
predicting a corresponding frame P subsequent to each said initial frame;
segmenting each said corresponding frame P into blocks;
determining an intra-channel actual difference between each block in each said initial frame and each block in each said corresponding predicted frame P;
accumulating, for each channel, said intra-channel difference of each block;
comparing each said accumulated intra-channel difference to a threshold;
if any said accumulated intra-channel difference reaches said threshold, inserting an I-frame as the next subsequent frame of each channel.

26. A method of video compression of a plurality of channels of video utilizing motion estimation comprising the steps of:

(a) comparing, for each channel, a segment of a current frame to be encoded to a corresponding segment of a previous frame to arrive at an intra-channel actual difference;

(b) repeating the comparison of step (a) until said intra-channel difference has been determined for all segments of said current frame of each channel;

(c) summing, for each channel, said intra-channel differences to arrive at a cumulative intra-channel difference for each channel;

(d) comparing said cumulative intra-channel difference of each channel to a threshold to determine whether a new I-frame should be inserted as the next subsequent frame to be encoded for all channels.

27. A method of compressing a plurality of channels of video, including a reference channel, said method comprising the steps of:

encoding a group of frames, said group including a predetermined number of frames of each channel, said encoding step including the sub-steps of:

(a) taking a pair of initial frames of a pair of channels;

(b) predicting a pair of subsequent frames of each said pair of channels, each said pair of predicted frames corresponding to one said pair of initial frames;

(c) determining an intra-channel difference between each said initial frame and said corresponding predicted frame;

(d) comparing each said intra-channel difference to a threshold value; and (e) inserting an I-frame as the next subsequent frame of each channel if any said intra-channel difference reaches said threshold value.

* * * * *